(12) United States Patent
Giordano, III (10) Patent No.: US 6,870,828 B1
(45) Date of Patent: Mar. 22, 2005

(54) METHOD AND APPARATUS FOR ICONIFYING AND AUTOMATICALLY DIALING TELEPHONE NUMBERS WHICH APPEAR ON A WEB PAGE

(75) Inventor: Joseph Giordano, III, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/868,216

(22) Filed: Jun. 3, 1997

(51) Int. Cl.$^7$ .................... H04L 12/66; H04M 11/00; G06F 15/16
(52) U.S. Cl. .................... 370/352; 370/401; 379/93.17; 709/203
(58) Field of Search ................................ 370/351–356, 370/400, 401, 402, 252, 270, 271, 261; 709/203–206; 707/10, 513, 500, 501, 520; 379/88.17, 93.17, 93.15, 90.01, 90, 349, 93, 96, 67, 88–89, 93.25, 93.19, 93.29, 93.08, 110.01, 707; 345/762, 133, 348, 375, 704; 340/825.44; 455/412–415, 340; 395/200, 203, 349, 600, 613

(56) References Cited

U.S. PATENT DOCUMENTS

| | | | |
|---|---|---|---|
| 4,995,074 A | | 2/1991 | Goldman et al. ............. 379/97 |
| 5,250,940 A | | 10/1993 | Valentaten et al. ......... 345/189 |
| 5,483,352 A | | 1/1996 | Fukuyama et al. ......... 358/402 |
| 5,764,736 A | * | 6/1998 | Shachar et al. .......... 379/93.09 |
| 5,784,001 A | * | 7/1998 | Deluca ....................... 345/133 |
| 5,822,539 A | * | 10/1998 | Van Hoff ............... 395/200.66 |
| 5,838,682 A | * | 11/1998 | Dekelbaum ................. 370/401 |
| 5,850,433 A | * | 12/1998 | Rondeau ..................... 379/201 |
| 5,859,636 A | * | 1/1999 | Pandit ........................ 707/501 |
| 5,903,631 A | * | 5/1999 | Smith ....................... 379/90.01 |

(List continued on next page.)

FOREIGN PATENT DOCUMENTS

| | | | |
|---|---|---|---|
| DE | 19644210 | 10/1995 | ............ H04M/3/42 |
| WO | WO 97/13352 | 4/1997 | ............ H04M/3/50 |
| WO | WO 97/13382 | 4/1997 | ............ H04Q/7/22 |

OTHER PUBLICATIONS

Kalberg et al., *Instant Access to Relevant Information and Operations*, Jan. 6, 1997, Intel Architecture Laboratories.

Low, *The Internet Telephony Red Herring*, May 15, 1996, Hewlett Packard– Intelligent Networked Platforms Dept.

*Primary Examiner*—Steven Nguyen
(74) *Attorney, Agent, or Firm*—Thelen Reid & Priest LLP; David B. Ritchie (57) ABSTRACT

A method and apparatus are provided for recognizing and accessing telephone numbers from a Web page. In the preferred embodiment of the invention, an HTML code of an accessed Web page is parsed and converted. A parsing algorithm applied to the text in the HTML document pattern-recognizes telephone numbers. Coding is added to iconify the recognized telephone numbers. The user's Internet-capable telephone displays the iconified telephone numbers. All previously-active links and graphical displays supported by the Internet-capable telephone are maintained in this display. To call a phone number, the user selects the icon, and the Internet-capable phone determines how to initiate the call. For a two-line phone, the Internet-capable telephone initiates a telephone call to the selected number. For a one-line phone, the Internet-capable telephone determines whether the line is available for a call. If the line is not currently being used, the Internet-capable telephone initiates a voice call to the selected number. However, if the user is connected to the Web, the Internet-capable telephone optionally transparently disconnects from the Internet and initiates a voice call to the selected telephone number. At the conclusion of the telephone call, the Internet-capable telephone optionally transparently re-connects to the Web.

37 Claims, 3 Drawing Sheets

U.S. PATENT DOCUMENTS 5,923,736 A * 7/1999 Shachar .................. 379/93.17
5,930,474 A * 7/1999 Dunworth .................. 707/10
5,946,647 A * 8/1999 Miller .......................... 704/9
5,966,652 A * 10/1999 Coad .......................... 455/412
6,012,102 A    1/2000 Shachar ........................ 710/5

* cited by examiner

METHOD AND APPARATUS FOR ICONIFYING AND AUTOMATICALLY DIALING TELEPHONE NUMBERS WHICH APPEAR ON A WEB PAGE

BACKGROUND OF THE INVENTION

1. Technical Field

The invention relates to electronic communication systems. More particularly, the invention relates to a system for recognizing and accessing telephone numbers from databases distributed over an electronic network.

2. Description of the Prior Art

Electronic networks are increasingly being used to store and distribute a variety of data. Examples of such electronic networks include the Internet, and intranet systems. For example, a World Wide Web (Web) page may include text, graphical displays, video displays, animation, and sounds.

The Web is usually accessed via telephone lines by a modem-connected computer. However, the Web may also be accessed through other devices, including personal data assistants, fax machines, and Internet-capable telephones. One telephone that provides Web access is described in M. Valentaten, B. Moeschen, Y. Friedman, Y. -T. Sidi, Z. Blkowsky, Z. Peleg, *Multi-Mode Home Terminal System that Utilizes a Single Embedded General Purpose/DSP Processor and a Single Random Access Memory*, U.S. Pat. No. 5,250,940 (Oct. 5, 1993).

A Web page is encoded in Hypertext Markup Language (HTML). An HTML document is a plain-text (ASCII) file that uses tags to denote the various elements in the document. An element may include an attribute, which is additional information that is included between tags.

HTML can be used to link text and/or images, such as icons, to another document or section of a document. The user activates a link by clicking on it, and the linked database is directly accessed. Links are used to access related information, or to contact a person or entity. However, information on a Web page must have the requisite HTML tags to be an active link.

Web pages often contain additional information such as telephone numbers. These phone numbers appear as informational numbers, for example, for customer service, marketing materials, further information, or for advertising. With the expansion of the Web, Web pages that specialize in providing phone numbers are being created. Such Web pages include directory services, white pages, and yellow pages.

However, these phone numbers are provided on the Web as text. HTML cannot be used to dial a telephone number over the Internet. Rather, the user must first search the text to locate a phone number. This search may be by visual inspection or by using a search engine to find a particular reference and its associated phone number. To access a number, the user must manually dial the number, or manually input the number into an automatic dialing program.

Furthermore, access to the Web is typically via a telephone line. If the user has only one telephone line, the user must disconnect from the Web before the phone number can be dialed. The prior art process for obtaining and calling a phone number listed on the Web is neither time nor cost effective, especially in a business environment.

It would therefore be an advantage to provide a system for recognizing telephone numbers from the World Wide Web. It would be a further advantage if such system if the system iconified telephone numbers to permit automatic dialing of a selected number. It would be yet another advantage if such system organized such telephone numbers to facilitate locating a desired number.

SUMMARY OF THE INVENTION

The invention provides a method and apparatus for recognizing and accessing telephone numbers that are contained within a Web page. The telephone numbers are iconified to permit automatic dialing of a selected number.

The preferred embodiment of the invention is adapted for use with a Web telephone. However, alternative embodiments of the invention are adapted for use with any Internet access device. In the preferred embodiment of the invention, either the server that controls Internet access or a client parses the HTML code of an accessed Web page. A parsing algorithm applied to the text in the HTML document pattern-recognizes telephone numbers having a standard format, such as United States numbers or international phone numbers.

Coding is added to iconify recognized telephone numbers. The invention may be configured to iconify all pattern-recognized telephone numbers, or to iconify only those numbers meeting specific criteria. An iconified telephone number is identified on the Internet-capable telephone screen by means including a button surrounding the number, font appearance, underlining, or highlighting.

Iconified telephone numbers may be either automatically or manually stored in an address book for later use.

To call a phone number, the user selects the icon, for example, by clicking on it. The Internet-capable phone determines how to initiate the call. If the user has a two-line phone, the Internet-capable telephone initiates a telephone call to the selected number.

If the user has a one-line phone, the Internet-capable telephone determines whether the line is available for a call. If the line isn't currently being used, the Internet-capable telephone initiates a voice call to the selected number. However, if the user is connected to the Web, the Internet-capable telephone automatically disconnects from the Internet and initiates a voice call to the selected telephone number. At the conclusion of the telephone call, the Internet-capable telephone may or may not automatically re-connect to the Web.

DETAILED DESCRIPTION OF THE INVENTION

The invention provides a method and system for recognizing telephone numbers from a Web page. The telephone numbers are iconified to permit automatic dialing of a selected number.

Figure 1:
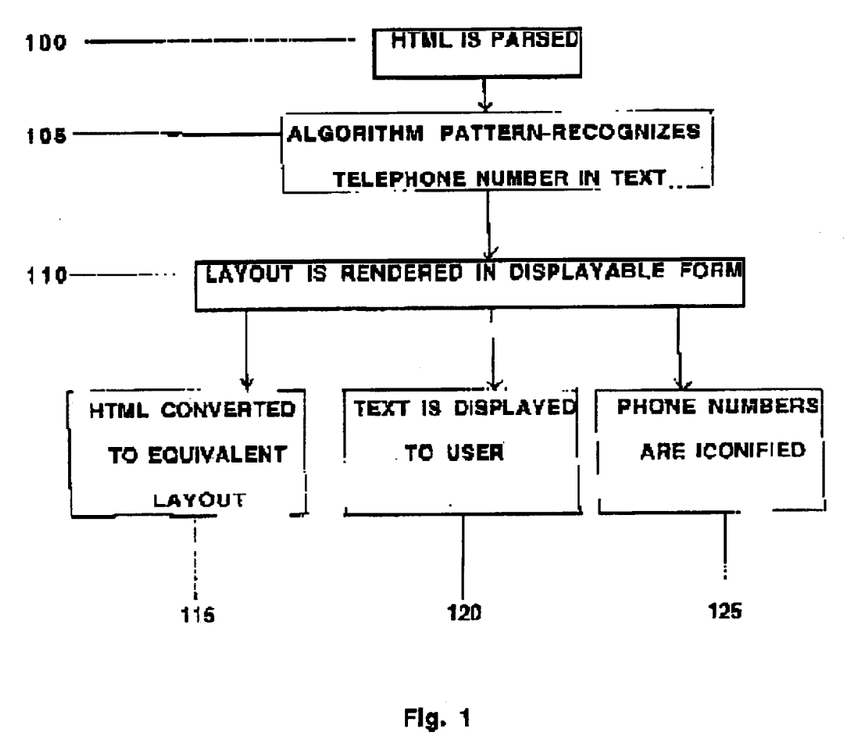
FIG. 1 is a flow chart of a method for recognizing and accessing telephone numbers according to the preferred embodiment of the invention.

FIG. 1 is a flow chart of a method for recognizing and accessing telephone numbers, according to the preferred embodiment of the invention. The preferred embodiment of the invention is adapted for use with the Web technique described above. (See U.S. Pat. No. 5,250,940.) However, alternative embodiments of the invention are adapted for use with any Internet access device.

The server that controls Internet access for the I-Phone parses the HTML code of an accessed Web page (100). While parsing the HTML, the server examines the text in the HTML document. It should be appreciated that parsing may just as readily be performed on the Client instead of the server. Thus, the following discussion is provided for purposes of example and not as a limitation on the scope of the invention. An algorithm is applied to this text to pattern-recognize telephone numbers (105). The algorithm is readily modified to recognize any telephone numbers having a standard format, such as United States numbers or international phone numbers.

The layout is then rendered in a displayable form (110). In the preferred embodiment of the invention, the server (or the Client) converts the HTML layout to an equivalent of the HTML layout (115). Alternative embodiments of the invention do not convert the HTML layout, or convert the HTML to different browser formats.

Where the parsing is performed by the server, the HTML page can be converted into different formats prior to being sent to clients, depending on the client's particular requirements. For example, an HTML page can be converted into formats accessible by a Web telephone, a cellular phone, or a personal digital assistant having a wireless phone. The files are sent to the user's Internet-capable telephone and the Web page is displayed on the telephone's screen (120). All previously-active links and graphical displays supported by the Internet-capable telephone are maintained in this display.

As a part of the HTML conversion, coding is added to iconify recognized telephone numbers (125). The invention may be configured to iconify all pattern-recognized telephone numbers, or to iconify only those numbers meeting specific criteria. In this case, a restrictor is used to direct the pattern-recognition software to only recognize or to ignore certain area codes, not to iconify certain foreign-country telephone numbers, or to iconify only telephone numbers associated with specific text headings such as "Customer Support." In such case the number still appears on the screen display, but is not iconified.

In the preferred embodiment of the invention, an iconified telephone number is identified on the Internet-capable telephone screen by a button surrounding the number. However, in alternative embodiments, the telephone number may be identified by different means, such as font appearance, underlining, or highlighting.

Figure 2:
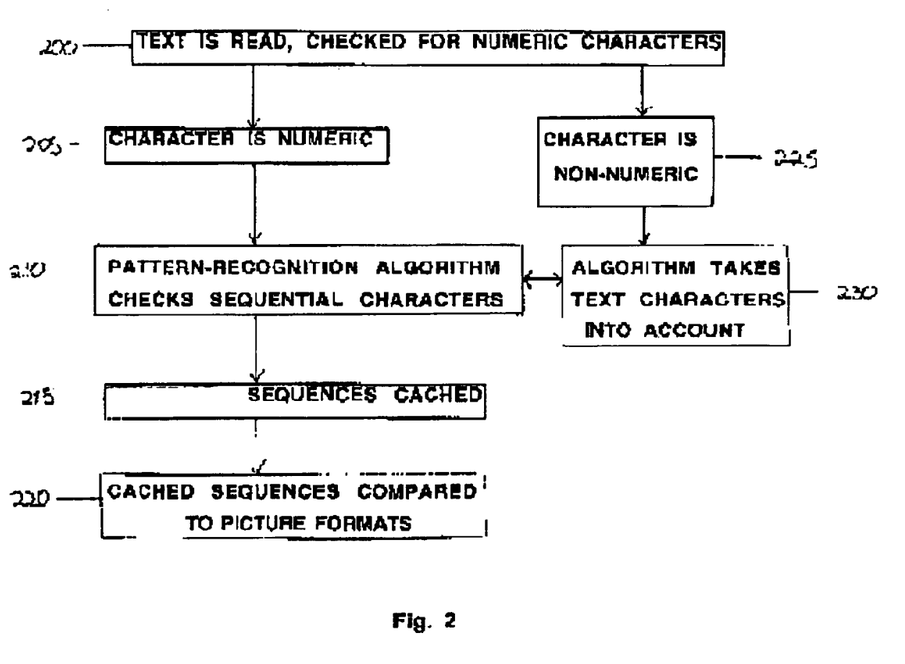
FIG. 2 is a flow chart of an algorithm for recognizing telephone numbers according to the invention.

FIG. 2 is a flow chart of an algorithm for recognizing telephone numbers, according to the invention. A set of Picture Formats are developed for the patterns of phone numbers. While the software program is reading the HTML document, it reads the text of every character that it comes across and checks to see if the text is a number (200). If the character is non-numeric (225), HTML parsing continues. However, the identification of a number (205) triggers the pattern-recognition algorithm (210). The pattern-recognition algorithm sequentially checks the characters following the identified number to determine if they also are numbers. A series of consecutive numbers is cached (215) and then compared to the Picture Formats (220). A matching format indicates a telephone number.

Telephone numbers can include text, such as hyphens or parentheses, or spaces interspersed with numbers. The patterns in the Picture Formats are therefore defined by those text characters that can be before and in between numbers. Because some text characters void the pattern, the algorithm should take this into account (230). Thus, the algorithm can distinguish, for example, among parentheses surrounding an area code, parentheses surrounding a sentence, and a serial number containing both numbers and text characters.

The patterns in the Picture Formats are also defined by the length of the number string. For example, U.S. area codes are usually three digits, and prefixes are usually three digits, followed by four final digits.

The following is an example of an algorithm that supports U.S. phone numbers. The algorithm looks for the following patterns:

'xxx*xxxx';
'x*xxx*xxxx';
'xxx**xxx*xxxx'; and
'xxxxxxx*xxxx';

where x represents a numeric digit, * represents one character, and ** represents either one or two characters, all of which can only be equal to "–", ")", ".", or " ". There is a first character case that is omitted which is a "+" or a "(".

Figure 3:
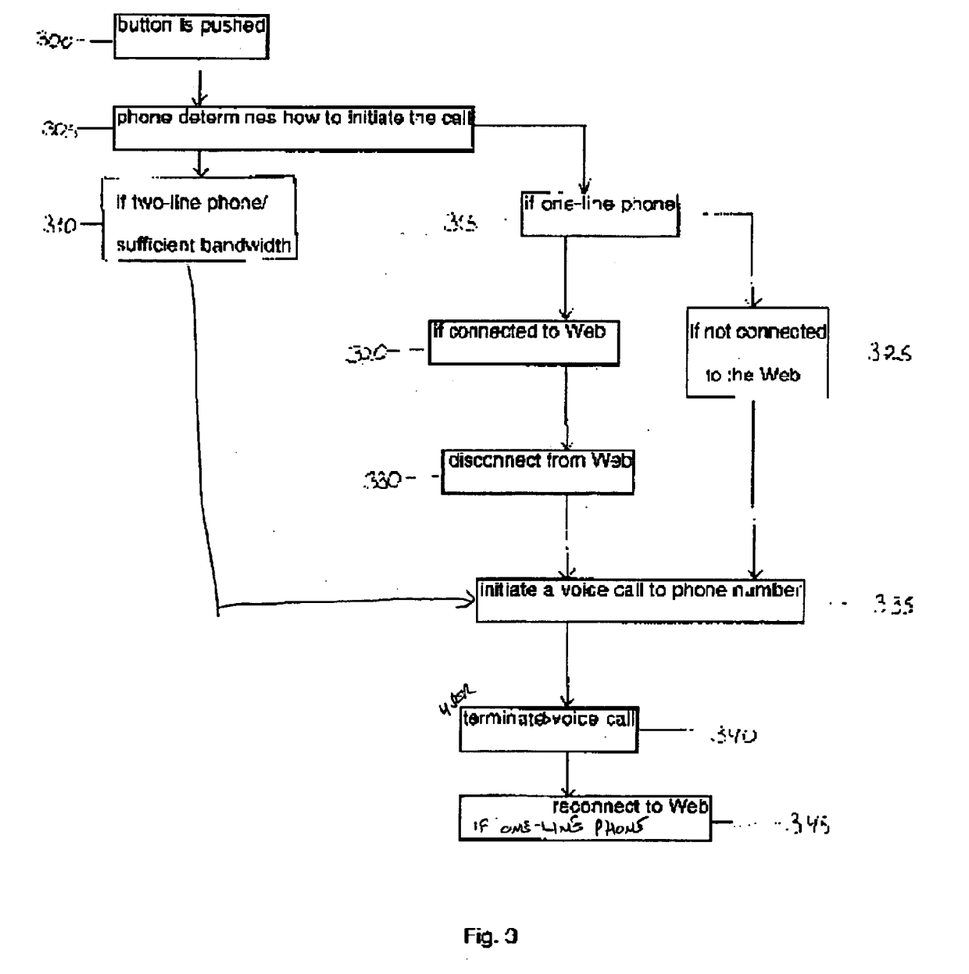
FIG. 3 is a flow chart of a method for accessing telephone numbers according to the invention.

FIG. 3 is a flow chart of a method for accessing telephone numbers, according to the invention. To call a phone number, the user selects the icon by clicking on it, or by another suitable selection method (300). The Internet-capable phone makes the determination of how to initiate the call (305). If the user has a two-line phone, the Internet-capable telephone initiates a telephone call to the selected number (335).

If the user has a one-line phone (315), the Internet-capable telephone first determines whether the line is available for a call. If the line is not currently being used for another telephone call or to connect to the Internet (325), the Internet-capable telephone initiates a voice call to the selected number (335). However, if the user is connected to the Web (320), the Internet-capable telephone automatically, and transparently, disconnects from the Internet session (330) and initiates a voice call to the selected telephone number.

The Internet-capable telephone recognizes the conclusion of the call and terminates the telephone call session (340). The Internet-capable telephone may then automatically, and transparently, re-connect to the Web (345). If desired, this feature may be a user-determined preference. In alternative embodiments of the invention, the Internet-capable telephone may be configured to re-connect to the Web only when directed to do so by the user. The Internet-capable telephone is thus seamlessly integrated with the Web.

In one embodiment of the invention, the pattern-recognition software is configured to recognize identification. For example, telephone numbers directly following headings such as Technical Support or Sales are recognized and iconified. In one embodiment of the invention, the pattern-recognition algorithm is configured for use with an Internet Telephone directory. The user can then look up a telephone number in such a directory and directly dial the retrieved numbers from the Internet-capable telephone display screen.

In an alternative embodiment of the invention, iconified telephone numbers are stored in an address book for later use. For example, HTML tags in an Internet telephone directory that identify a record, e.g. including name and address, that can be added to an address book are recognized. These records can then be either automatically or manually added to the user's address book. In a manual implementation, the Internet-capable telephone displays a button or other type of selection means that the user can select to store a record, including such information as name and address.

Although the invention is described herein with reference to the preferred embodiment, one skilled in the art will readily appreciate that other applications may be substituted for those set forth herein without departing from the spirit and scope of the present invention.

For example, in the preferred embodiment of the invention, the translation from HTML is performed by the server. However, in alternative embodiments, the translation is performed by the Internet-capable telephone, or by a computer networked to the Internet-capable telephone. Further, such conversion may be an HTML-to-HTML conversion, for example as provided by a plug-in that operates in a connection with a conventional Web browser, such as Navigator, manufactured by Netscape Communications Corporation of Mountain View, Calif. Further, pattern recognition may be performed by the Client.

Accordingly, the invention should only be limited by the claims included below.

What is claimed is:

1. A method performed on a Web page containing text-based information other than previously iconified information, said method performed by a communication system including a Web page server containing said Web page, an access server, and an access device capable of communicating with said Web page server through said access server, said method performed during a communication session and comprising:
at said access server:
retrieving said Web page contained on said Web page server;
parsing said text-based information within said Web page;
recognizing a text-based telephone number contained within said text-based information of said parsed Web page, said text-based telephone number including a plurality of number symbols and at least one text symbol interspersed with said plurality of number symbols;
converting an HTML code representation of said Web page; and
adding a representation that iconifies said recognized text-based telephone number.

2. The method of claim 1, further comprising:
at said access device, transparently disconnecting from said communication session upon selection of said representation that iconifies said recognized text-based telephone number to initiate a telephone call session.

3. The method of claim 2, further comprising at said access device:
recognizing the termination of said telephone call session; and
transparently re-connecting to said communication session.

4. The method of claim 1, further comprising at said access server:
transmitting said Web page with said iconic representation of said recognized text-based telephone number to said access device.

5. The method of claim 4, wherein said access device is an Internet-capable telephone.

6. The method of claim 1, wherein said iconified telephone number is identified by one of a button surrounding the number, font appearance, underlining, or highlighting.

7. The method of claim 1, wherein all recognized telephone numbers are iconified.

8. The method of claim 1, wherein telephone numbers meeting a specific criteria are iconified.

9. The method of claim 1, wherein said parsing and recognizing further comprises:
developing a set of Picture Formats for the patterns of telephone numbers;
reading an accessed Web page;
checking every character in said text-based information within said Web page to determine if said character is a numeric character;
applying a pattern-recognition algorithm to sequentially check a character following an identified numeric character to determine if said following character is any of a numeric or an interspersed text or punctuation character;
caching a series of consecutive identified numeric characters; and
comparing said cached series to said Picture Formats;
wherein a matching format indicates a text-based telephone number.

10. The method of claim 2, wherein said transparently disconnecting from said communication session upon selection of said iconified text-based telephone number and calling said telephone number further comprises at said access device:
selecting said representation that iconifies said recognized text-based telephone number in a display of said access device;
initiating a telephone call with said access device to said selected recognized text-based telephone number if a telephone line or sufficient bandwidth is available;
transparently disconnecting said access device from said session if a telephone line is not available, and thereupon initiating a telephone call to said selected recognized text-based telephone number;
recognizing with said access device the termination of said telephone call; and
optionally transparently re-connecting said access device to said communication session.

11. The method of claim 4, further comprising at said access device:
automatically storing said representation that iconifies said recognized text-based telephone number in an address book.

12. A method for utilizing an access server to recognize and iconify telephone numbers from a Web page, said method comprising:
retrieving said Web page during an Internet session linking a Web page server to an access device, wherein said Web page is retrieved by said access server from said Web page server at the request of said access device;
parsing the HTML code of said Web page;
applying a parsing algorithm to text-based information other than previously iconified information within said Web page to pattern-recognize a text-based telephone number contained therein;
converting said HTML code to a representation of said Web page;
adding coding to said representation of said Web page to produce a selectable telephone number icon associated with said recognized text-based telephone number; and
transmitting said representation of said Web page with said selectable telephone number icon to said access device for display.

13. The method of claim 12, wherein said applying said parsing algorithm further comprises:

developing a set of Picture Formats for the patterns of text-based telephone numbers;

reading an accessed HTML document using a software program on said access server;

checking every character in said text-based information of said HTML document to determine if said checked character is a numeric character;

using pattern-recognition algorithm to sequentially check a character following an identified number to determine if said character is any of numeric or interspersed text or punctuation character;

caching a series of consecutive numeric characters; and comparing said cached series to said Picture Formats;

wherein a matching format indicates a text-based telephone number.

14. The method of claim 12, wherein said selectable telephone number icon is identified by one of a button surrounding the number, font appearance, underlining, or highlighting.

15. The method of claim 12, wherein all recognized telephone numbers are iconified.

16. The method of claim 12, wherein telephone numbers meeting a specific criteria are iconified.

17. A program storage device readable by a machine, embodying a program of instructions executable by the machine to perform a method for utilizing an access server to recognize and iconify telephone numbers from a Web page, said method comprising:

retrieving said Web page during an Internet session linking a Web page server to an access device, wherein said Web page is retrieved by said access server from said Web page server at the request of said access device;

parsing the HTML code of said Web page;

applying a parsing algorithm to text-based information other than previously iconified information within said Web page to pattern-recognize a text-based telephone number contained therein;

converting said HTML code to a representation of said Web page;

adding coding to said representation of said Web page to produce a selectable telephone number icon associated with said recognized text-based telephone number; and transmitting said representation of said Web page with said selectable telephone number icon to said access device for display.

18. The device of claim 17, wherein said applying said parsing algorithm further comprises:

developing a set of Picture Formats for the patterns of text-based telephone numbers;

reading an accessed HTML document;

checking every character in said text-based information of said HTML document to determine if said checked character is a numeric character;

using pattern-recognition algorithm to sequentially check a character following an identified number to determine if said character is any of numeric or interspersed text or punctuation character;

caching a series of consecutive numeric characters; and comparing said cached series to said Picture Formats, wherein a matching format indicates a text-based telephone number.

19. The device of claim 17, wherein said selectable telephone number icon is identified by one of a button surrounding the text-based telephone number, font appearance, underlining, or highlighting.

20. The device of claim 17, wherein all recognized text-based telephone numbers are iconified.

21. The device of claim 17, wherein text-based telephone numbers meeting specific criteria are iconified.

22. A system for processing a Web page containing text-based information other than previously iconified information, said system including a Web page server containing said Web page, an access server, and an access device capable of communicating with said Web page server through said access server, said processing performed during a communication session, said system comprising:

said access server comprising:

means for retrieving said Web page contained on said Web page server;

means for parsing said text-based information within said Web page;

means for recognizing a text-based telephone number contained within said text-based information of said parsed Web page, said text-based telephone number including a plurality of number symbols and at least one text symbol interspersed with said plurality of number symbols;

means for converting an HTML code representation of said Web page; and means for adding a representation that iconifies said recognized text-based telephone number.

23. The system of claim 22, wherein said access device comprises:

means for transparently disconnecting from said communication session upon selection of said representation that iconifies said recognized text-based telephone number; and means for automatically dialing said selected recognized text-based telephone number to initiate a telephone call session.

24. The system of claim 23, wherein said access device further comprises:

means for recognizing the termination of said telephone call session; and means for transparently re-connecting to said communication session.

25. The system of claim 22, wherein said access server further comprises:

means for transmitting said Web page with said iconic representation of said recognized text-based telephone number to said access device.

26. The system of claim 25, wherein said access device is an Internet-capable telephone.

27. The system of claim 22, wherein said representation that iconifies said recognized text-based telephone number is identified by one of a button surrounding said recognized text-based number, font appearance, underlining, or highlighting.

28. The system of claim 22, wherein all recognized text-based telephone numbers are each converted to an iconic representation.

29. The system of claim 22, wherein recognized text-based telephone numbers meeting specific criteria are each converted to iconic representations.

30. The system of claim 22, wherein said means for parsing and means for recognizing further comprise:

means for developing a set of Picture Formats for the patterns of telephone numbers;

means for reading an accessed Web page;

means for checking every character in said text-based information within said Web page to determine if said character is a numeric character;

means for sequentially checking a character following an identified numeric character to determine if said following character is any of a numeric or an interspersed text or punctuation character;

means for caching a series of consecutive identified numeric characters; and means for comparing said cached series to said Picture Formats;

wherein a matching format indicates a text-based telephone number.

31. The system of claim 23, wherein said means for transparently disconnecting and said means for automatically dialing further comprise:

means for selecting said representation that iconifies said recognized text-based telephone number in a display of said access device;

means for initiating a telephone call with said access device to said selected recognized text-based telephone number if a telephone line or sufficient bandwidth is available;

means for transparently disconnecting said access device from said session if a telephone line is not available, and thereupon initiating a telephone call to said selected recognized text-based telephone number;

means for recognizing with said access device the termination of said telephone call; and means for optionally transparently re-connecting said access device to said communication session.

32. The system of claim 25, wherein said access device further comprises:

means for automatically storing said representation that iconifies said recognized text-based telephone number in an address book.

33. An access server apparatus for recognizing and iconifying telephone numbers from a Web page, said apparatus comprising:

means for retrieving said Web page during an Internet session linking a Web page server to an access device, wherein said Web page is retrieved by said access server from said Web page server at the request of said access device;

means for parsing the HTML code of said Web page;

means for applying a parsing algorithm to text-based information other than previously iconified information within said Web page to pattern-recognize a text-based telephone number contained therein;

means for converting said HTML code to a representation of said Web page;

means for adding coding to said representation of said Web page to produce a selectable telephone number icon associated with said recognized text-based telephone number; and means for transmitting said representation of said Web page with said selectable telephone number icon to said access device for display.

34. The apparatus of claim 33, wherein said means for applying said parsing algorithm further comprises:

means for developing a set of Picture Formats for the patterns of text-based telephone numbers;

means for reading an accessed HTML document;

means for checking every character in said text-based information of said HTML document to determine if said checked character is a numeric character;

means for sequentially checking a character following an identified number to determine if said character is any of numeric or an interspersed text or punctuation character;

means for caching a series of consecutive numeric characters; and means for comparing said cached series to said Picture Formats;

wherein a matching format indicates a text-based telephone number.

35. The apparatus of claim 33, wherein said selectable telephone number icon is identified by one of a button surrounding the text-based telephone number, font appearance, underlining, or highlighting.

36. The apparatus of claim 33, wherein all recognized text-based telephone numbers are iconified.

37. The apparatus of claim 33, wherein text-based telephone numbers meeting specific criteria are iconified.

* * * * *

UNITED STATES PATENT AND TRADEMARK OFFICE
CERTIFICATE OF CORRECTION

PATENT NO. : 6,870,828 B1
DATED : March 22, 2005
INVENTOR(S) : Joseph Giordano, III It is certified that error appears in the above-identified patent and that said Letters Patent is hereby corrected as shown below:

Title page,
Item [56], References Cited, U.S. PATENT DOCUMENTS, insert
-- 5,708,780 1/1998 Levergood et al. …..395/200.12
   5,764,910 6/1998 Shachar …..395/200.53
   5,812,776 9/1998 Gifford …..395/200.47
   6,052,730 4/2000 Felciano et al. …..709/225
   6,122,657 9/2000 Hoffman, Jr. et al. …..709/201 --.
After "5,923,736 A" delete "*"; and after "5,764,736 A" delete "*".
OTHER PUBLICATIONS, insert -- Stein, Lincoln D. "Creating a Self-Referencing URL That Preserves State Information --.

Signed and Sealed this

Thirtieth Day of August, 2005

JON W. DUDAS
*Director of the United States Patent and Trademark Office*